UNITED STATES PATENT OFFICE.

LEO GANS, OF FRANKFORT, GERMANY, ASSIGNOR TO LEOPOLD CASSELLA & COMPANY, OF SAME PLACE.

BLUE-BLACK DYE.

SPECIFICATION forming part of Letters Patent No. 442,369, dated December 9, 1890.

Application filed December 20, 1889. Serial No. 334,448. (Specimens.)

*To all whom it may concern:*

Be it known that I, LEO GANS, doctor of philosophy, a citizen of the Empire of Germany, and a resident of Frankfort-on-the-Main, Germany, have invented certain new and useful Improvements in Coloring-Matters, of which the following is a specification.

In my application for patent of this day I have described my new process for the production of amidonaphtholmonosulphonic acid and of azoic coloring-matters deriving from this new acid.

I herewith describe more particularly the bluish-black coloring-matters, which I obtain by the action of amidonaphtholmonosulphonic acid upon the tetrazo compound from benzidine and the analogous bodies, such as methyl benzidine, tolidine, diamidostilbene, paraphenylenediamine, diamidodiphenol ethers, diamidoæthoxydiphenyl, or sulphoacids thereof.

*Example I.*—18.4 kilograms benzidine are diazotized and in alkaline solution combined with fifty-four kilograms amidonaphtholmonosulphonate of sodium. A difficultly-soluble precipitate of a dye-stuff is formed immediately, which dyes unmordanted cotton in alkaline or in neutral bath containing some common salt a bluish black of great intensity. The same combination in acid solution produces a violet dye-stuff.

*Example II.*—The amidonaphtholmonosulphonic acid may as well be used for the production of mixed coloring-matters. For this purpose I may first combine tetrazo-diphenyl or analogous tetrazo compounds with one equivalent of the amidonaphtholmonosulphonic acid, and then react with this intermediate product on phenols, amines, or their sulpho-acids, or employ the inverse method, combining the intermediate products of tetrazo-diphenyl, &c., and amines or phenols with amidonaphtholmonosulphonic acid. For instance, twenty-one kilograms tolidine are diazotized and first combined in a well-cooled alkaline solution with twenty-seven kilograms of amidonaphtholmonosulphonic acid. The intermediate product, which is nearly insoluble in water, is introduced into an alkaline solution of thirty-five kilograms beta-naphthol-delta-disulphonic acid. The dye-stuff dyes cotton a deep blue.

What I claim as my invention is—

The blue-black dyes derived from amidonaphtholmonosulphonic acid and tetrazo-diphenyl or homologous compounds, soluble in water and nearly insoluble in alcohol, turning blue in sulphuric acid, from which solution it is precipitated by water, substantially as described.

In testimony that I claim the foregoing as my invention I have signed my name, in presence of two witnesses, this 14th day of November, 1889.

LEO GANS.

Witnesses:
THADDEUS ENGEL,
ERNST H. SCHENCK.